United States Patent
Ho et al.

(10) Patent No.: US 7,149,038 B2
(45) Date of Patent: Dec. 12, 2006

(54) ZOOM LENS ASSEMBLY

(75) Inventors: Gung Hsuan Ho, Hsinchu Hsien (TW); Chir Weei Chang, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 0 days.

(21) Appl. No.: 11/385,891

(22) Filed: Mar. 22, 2006

(65) Prior Publication Data

US 2006/0245076 A1 Nov. 2, 2006

(51) Int. Cl.
*G02B 15/14* (2006.01)

(52) U.S. Cl. .................. 359/687; 359/686; 359/684

(58) Field of Classification Search ............... 359/686, 359/687, 683, 676
See application file for complete search history.

(56) References Cited

U.S. PATENT DOCUMENTS

| | | | |
|---|---|---|---|
| 5,285,316 A | 2/1994 | Miyano et al. | |
| 5,359,457 A | 10/1994 | Saka et al. | |
| 5,396,367 A | 3/1995 | Ono et al. | |
| 5,612,825 A | 3/1997 | Horiuchi et al. | |
| 5,712,733 A | 1/1998 | Mukaiya | |
| 5,940,221 A | 8/1999 | Okayama et al. | |
| 5,978,152 A | 11/1999 | Okayama et al. | |
| 6,538,825 B1 | 3/2003 | Sun | |
| 6,587,281 B1 | 7/2003 | Hozumi et al. | |
| 6,714,355 B1 | 3/2004 | Miyauchi | |
| 6,744,571 B1 * | 6/2004 | Ishii et al. ................. | 359/795 |
| 6,788,474 B1 | 9/2004 | Hozumi et al. | |

* cited by examiner

*Primary Examiner*—Loha Ben
*Assistant Examiner*—Jack Dinh
(74) *Attorney, Agent, or Firm*—Birch, Stewart, Kolasch & Birch, LLP

(57) ABSTRACT

The present invention relates to a zoom lens assembly employing a four lens group design, which in sequence from an object end thereof to an image end thereof has a first lens group having a positive focal length; a second lens group having a negative focal length; a third lens group having a positive focal length; and a fourth lens group having a positive focal length. In the course of zooming, the third lens group moves serving as a light collector and an assisting compensator for the fourth lens group, so that the diameter of the elements behind the diaphragm can be decreased, which in turn decreases the total length and diameter of the overall zoom lens assembly, meeting the demands of miniaturization of zoom lens assembly without compromising image quality into consideration.

29 Claims, 2 Drawing Sheets

| | | ITRI 1 | ITRI 2 | ITRI 3 | ITRI 4 | ITRI 5 | Prior art 5285316 | 5396367 | 5978152 | 5359457 | 5712733 | 5940221 | 5612825 |
|---|---|---|---|---|---|---|---|---|---|---|---|---|---|
| 2 | T (total track) | 80 | 75 | 75 | 75 | 75 | 67 | 73 | 70.2 | 82.2 | 108.4 | 96.4 | 85.8 |
| 3 | H (image height) | 3.64 | 3.6381 | 3.6381 | 3.6381 | 3.6381 | 3 | 3 | 3.3 | 3 | 4.68 | 4.067 | 4 |
| 4 | H11 (height of 1st lens of 1st group) | 15 | 13.9838 | 14.0721 | 14.8477 | 13.1898 | 14.85 | 15.85 | 16.3 | 22.0221 | 25.42 | 25.79 | 20.247 |
| 5 | f31 (edge thickness of 1st lens of 3rd group) | 1.3454 | 1.9935 | 1.9186 | 2.8704 | 2.7266 | 2.0827 | 2.7252 | 2 | 4.1276 | 4.0348 | 2.557 | 2.3237 |
| 6 | T31 (center thickness of 1st lens of 3rd group) | 1.8234 | 2.3899 | 2.5395 | 3.5906 | 3.2662 | 2.8108 | 4.0611 | 6.3044 | 5.0336 | 5.9812 | 6.1837 | 3.8642 |
| 7 | f1 | 41.4614 | | | | | | | | | | | |
| 8 | |f2| | 8.4608 | | | | | | | | | | | |
| 9 | f3 (focal length of the 3rd group) | 32.0467 | 29.7754 | 29.0375 | 26.1456 | 30.0308 | 24.2491 | 13.3278 | 15.3703 | 25.1991 | 33.1684 | 24.4253 | 20.8925 |
| 10 | f4 | 23.7064 | | | | | | | | | | | |
| 11 | ft (focal length at tele) | 63 | 63 | 63 | 63 | 63 | 47.372 | 60.43 | 61.244 | 47.57 | 73 | 84.25 | 73.82 |
| 12 | fw (focal length at wide) | 6.3 | 6.3 | 6.3 | 6.3 | 5.3 | 6.3 | 6.3 | 6.3 | 6.3 | 6.3 | 6.3 | 6.3 |
| 13 | T/H | 21.97802 | 20.61515 | 20.61515 | 20.61515 | 20.61515 | 22.33333 | 24.33333 | 21.27272 | 27.4 | 23.16239 | 23.70297 | 21.45 |
| 14 | (H11*fw)/(H*ft) | 0.412087 | 0.384370 | 0.386798 | 0.408116 | 0.304999 | 0.658300 | 0.550802 | 0.508101 | 0.972175 | 0.468756 | 0.474184 | 0.431983 |
| 15 | ft/fw | 10 | 10 | 10 | 10 | 11.88679 | 7.519365 | 9.592063 | 9.721269 | 7.550793 | 11.58730 | 13.37301 | 11.71746 |
| 16 | f31/T31 | 0.737852 | 0.834135 | 0.755503 | 0.799420 | 0.834792 | 0.740963 | 0.671049 | 0.317238 | 0.820009 | 0.674580 | 0.413506 | 0.601340 |
| 17 | f3*T31 | 58.43395 | 71.16022 | 73.74073 | 93.87839 | 98.08659 | 68.15937 | 54.12552 | 96.90051 | 126.8421 | 198.3868 | 151.0387 | 80.73279 |

FIG. 4

ZOOM LENS ASSEMBLY

FIELD OF THE INVENTION

The present invention relates to lenses, and more specifically, to a zoom lens assembly applied to an image-capturing device.

BACKGROUND OF THE INVENTION

With continual improvement of fabricating technology of photosensitive elements (CMOS/CCD), image capturing devices are being developed towards the trend of high resolution and small size. Common image capturing devices, such as phone cameras, Digital Video Cameras (DVC), Digital Still Cameras (DSC) and Digital Single Lens Reflex (DSLR) cameras, with increasing resolution are being developed to satisfy the needs of all kinds of customers.

As to the current technology trend of image capturing devices, in addition to decreasing of the unit size of sensitivity element and the increasing of sensitivity thereof, in order to meet the requirements of high-resolution still images and film development, increase of the number of pixels in an image is also desirable; and so as increase of the storage capacity of digital storing mediums and enhancement of compression for digital signals. It may also be desirable to provide dynamic images having enough resolution to satisfy the need to play high quality images. In other words, the current development trend is to provide light and compact products having high zoom capacity and luminance. It is therefore desirable to develop zoom lens assembly suitable for image capturing devices with medium/high resolution and medium/high photosensitive elements.

The standard features of a camera, such as size, diaphragm size ($F_{no}$), field of view (FOV), zoom ratio and numbers of lens, cannot be simultaneously optimized under the objective of miniaturization. For example, U.S. Pat. No. 5,285,316, No. 5,396,367, No. 5,978,152, No. 5,359,457, No. 5,712,733, No. 5,940,221 and No. 5,612,825 all employ a zooming design with four lens groups.

U.S. Pat. No. 5,285,316 discloses a design having zoom ratio of 7 (6.3 mm~47.972 mm) and diaphragm size up to 2 ($F_{no}$~2), wherein the focal length of the four lens groups are respectively arranged as positive, negative, positive and positive. The design employs ten pieces of lens to construct the four lens groups wherein the third lens group is stationary, and two aspheric surfaces are provided. Thus a design having image height of 3.3 mm, total length of 67 mm and diaphragm of 14.85 mm is provided. U.S. Pat. No. 5,396,367 discloses a design having zoom ratio of 10 (6.3 mm~60.43 mm) and $F_{no}$~1.85, wherein the focal length of the four lens groups are respectively arranged as positive, negative, positive and positive. The design employs ten pieces of lens to construct the four lens groups wherein the third lens group is stationary, and 3 aspheric surfaces are provided. Thus a design having image height of 3.3 mm, total length of 73 mm and diaphragm of 15.85 mm is provided. U.S. Pat. No. 5,978,152 discloses a design having a zoom ratio of 10 (6.3 mm~61.244 mm) and $F_{no}$~1.46, wherein the focal length of the four lens group are respectively arranged as positive, negative, positive and positive. The design employs ten pieces of lens to construct the four lens groups wherein the third lens group is stationary, and four aspheric surfaces are provided. Thus a design having image height of 3 mm, total length of 70.2 mm and diaphragm of 16.3 mm is thus provided. U.S. Pat. No. 5,359,457 discloses a design having a zoom ratio of 7 (6.3 mm~47.57 mm) and $F_{no}$~1.64, wherein the focal length of the four lens groups are respectively arranged as positive, negative, positive and positive. The design employs nine pieces of lens to construct the four lens groups wherein the third lens group is stationary, and two aspheric surfaces are provided. Thus a design having image height of 3 mm, total length of 82.2 mm and diaphragm of 22.02 mm is thus provided. U.S. Pat. No. 5,712,733 discloses a design having a zoo ratio of 12 (6.3 mm~73 mm) and $F_{no}$~1.75, wherein the focal length of the four lens group are respectively arranged as positive, negative, positive and positive. The design employs ten pieces of lens to construct the four lens groups wherein the third lens group is stationary, and 2 aspheric surfaces are provided. Thus a design having image height of 4.68 mm, total length of 108.4 mm and diaphragm 25.42 mm of diaphragm is provided. U.S. Pat. No. 5,940,221 discloses a design having a zoom ratio of 12 (6.3 mm~84.25 mm) and $F_{no}$~1.47, wherein the focal length of the four lens groups are respectively arranged as positive, negative, positive and positive. The design employs ten pieces of lens to construct the four lens groups wherein the third lens group is stationary, and four aspheric surfaces are provided. Thus a design having image height of 4.067 mm, total length of 96.4 mm and diaphragm of 25.79 mm is provided. U.S. Pat. No. 5,612,825 discloses a design having a zoom ratio of 12 (6.3 mm~73.82 mm) and $F_{no}$~1.8, wherein the focal length of the four lens groups are respectively arranged as positive, negative, positive and positive. The design employs twelve pieces of lens to construct the four lens groups wherein the third lens group is stationary, and one aspheric surface is provided. Thus a design having image height of 4 mm, total length of 85.8 mm and diaphragm of 20.247 mm is provided.

However, in the above conventional techniques, only the second and/or fourth lens groups are designed to be movable, which lack variability in zooming. In the cases of increasing resolution and luminance, the overall size of devices cannot be decreased, the zooming capacity is therefore limited such that image with appropriate zooming cannot be achieved. Furthermore, the above conventional techniques employ considerable number of lens, which increases the fabrication cost thereof.

Thereafter, U.S. Pat. No. 6,788,474, No. 6,587,281, No. 6,714,355, and No. 6,538,825 respectively disclose a design wherein the second, third, and fourth lens groups are movable.

U.S. Pat. No. 6,788,474 discloses a design having a zoom ratio of 10 (5.864 mm~58.871 mm) and $F_{no}$~2.8, wherein the focal length of the four lens groups are respectively arranged as positive, negative, positive and positive. The design employs eleven pieces of lens to construct the four lens groups wherein the third lens group is movable, and 2 aspheric surfaces are provided. Thus a design having image height of 3.71 mm, total length of 78.1 mm and diaphragm of 19 mm is provided. U.S. Pat. No. 6,587,281 discloses a design having a zoom ratio of 10 (5.864 mm~58.871 mm) and $F_{no}$~2.8, wherein the focal length of the four lens groups are respectively arranged as positive, negative, positive and positive. The design employs eleven pieces of lens to construct the four lens groups wherein the third lens group is movable, and 2 aspheric surfaces are provided. Thus a design having image height of 3.71 mm, total length of 78.1 mm and diaphragm of 19 mm is provided. U.S. Pat. No. 6,714,355 discloses a design having a zoom ratio of 3 (3.643 mm~10.42 mm) and $F_{no}$~2.8, wherein the focal length of the four lens groups are respectively arranged as positive, negative, positive and positive. The design employs ten pieces of lens to construct the four lens groups wherein the third lens group is movable, and 1 aspheric surface is provided. U.S. Pat. No. 6,538,825 discloses a design having a zoom ratio of 3 (8.054 mm~23.74 mm) and $F_{no}$~2.8, wherein the focal length of the four lens groups are respectively arranged as positive, negative, positive and positive. The design employs nine pieces of lens to construct the four lens groups wherein the third lens group is movable, and 2 aspheric surfaces are provided. Thus a design having image height of 4 mm is provided.

However, the zoom ratio in the case of the abovementioned designs with movable second, third and fourth lens groups is generally not enough, and the maximum diaphragm size ($F_{no}$) is too high or the number of lens is too many. The problem of miniaturizing the zoom lens assembly is still not solved in the abovementioned US patents. At the same time, the US patents cannot simultaneously increase the luminance and the FOV and/or decrease the number of lens while reducing the size and fabrication cost thereof. Additionally, zoom lens assembly fabricated for different product classes cannot be provided.

Consequently, there is a need for a technique that provides compact zoom lens assembly having high luminance and low fabrication cost to overcome the drawbacks of the prior art.

SUMMARY OF THE INVENTION

Regarding the drawbacks of the above-mentioned conventional technologies, a primary objective of the present invention is to provide a zoom lens assembly taking both the miniaturization and image quality into consideration.

Another objective of the present invention is to provide a zoom lens assembly which has lower fabricating cost.

Still another objective of the present invention is to provide a zoom lens assembly that can be applied to products of different classes for promoting industrial applicability.

In accordance with the above and other objectives, the present invention proposes a zoom lens assembly, which includes an object end; an image end; a first lens group having a positive focal length, the first lens group being stationary when the zoom lens assembly is zooming; a second lens group having a negative focal length, the second lens group moving from the object end to the image end when the zoom lens assembly is zooming and operating from a periscopic mode to a telescopic mode; a third lens group having a positive focal length, the third lens group moving from the image end to the object end when the zoom lens assembly is zooming and operating from the periscopic mode to the telescopic mode; and a fourth lens group having a positive focal length, the fourth lens group moving from the image end to the object end when the zoom lens assembly is zooming and operating from the periscopic mode to the telescopic mode; wherein the first, second, third and fourth lens group are disposed in sequence from the object end to the image end, and the zoom lens assembly satisfies the following conditions: $18<T\div H<25$, $0.15<(H11\times fw)\div(H\times ft)<0.55$, $0.5<t31\div T31<1.0$, and $50<f3\times T31<105$, where H is a height of an image captured by the zoom lens assembly, T is a total length of the zoom lens assembly, H11 is a diameter of a first lens of the first lens group, ft is an equivalent focal length of the zoom lens assembly when the zoom lens assembly is operating in the telescopic mode, fw is an equivalent focal length of the zoom lens assembly when the zoom lens assembly is operating in the periscopic mode, t31 is a thickness of an edge region of a first lens of the third lens group, T31 is a thickness of a central region of the first lens of the third lens group, and f3 is an equivalent focal length of the third lens group.

The first lens group comprises in sequence from the object end to the image end a first lens, a second lens and a third lens. The first lens is a negative lens, and the second and third lenses are positive lenses. Preferably, the first and second lenses cooperatively form a cemented lens, and the third lens is a positive lens in the shape of a meniscus.

The second lens group comprises in sequence from the object end to the image end a fourth lens, a fifth lens and a sixth lens. The fourth and fifth lenses are negative lenses, and the sixth lens is a positive lens. Preferably, the fifth and sixth lenses cooperatively form a cemented lens.

The third lens group comprises at least a seventh lens having two aspheric surfaces. Preferably, the seventh lens is a positive lens in the shape of a meniscus, and has a convex surface facing the object end.

The fourth lens group comprises in sequence from the object end to the image end an eighth lens and a ninth lens. The eighth lens is a negative lens. The ninth lens is a positive lens and has at least an aspheric surface. Preferably, the eighth and ninth lenses cooperatively form a cemented lens.

In another aspect of the present invention, the zoom lens assembly includes an object end; an image end; a first lens group having a positive focal length, the first lens group comprising in sequence from the object end to the image end a first lens, a second lens and a third lens, the first lens being a negative lens, the second and third lenses being positive lenses; a second lens group having a negative focal length, the second lens group comprising in sequence from the object end to the image end a fourth lens, a fifth lens and a sixth lens, the fourth and fifth lenses being negative lenses, the sixth lens being a positive lens; a third lens group having a positive focal length and at least a seventh lens comprising two aspheric surfaces; a fourth lens group having a positive focal length, the fourth lens group comprising in sequence from the object end to the image end an eighth lens and a ninth lens, the eighth lens being a negative lens, the ninth lens being a positive lens and comprising at least an aspheric surface; wherein the first, second, third and fourth lens groups are disposed in sequence from the object end to the image end, and the zoom lens assembly satisfies the following conditions: $18<T\div H<25$, $0.15<(H11\times fw)\div(H\times ft)<0.55$, $0.5<t31\div T31<1.0$, and $50<f3\times T31<105$, where H is a height of an image captured by the zoom lens assembly, T is a total length of the zoom lens assembly, H11 is a diameter of a first lens of the first lens group, ft is an equivalent focal length of the zoom lens assembly when the zoom lens assembly is operating in the telescopic mode, fw is an equivalent focal length of the zoom lens assembly when the zoom lens assembly is operating in the periscopic mode, t31 is a thickness of an edge region of a first lens of the third lens group, T31 is a thickness of a central region of the first lens of the third lens group, and f3 is an equivalent focal length of the third lens group.

It is can be seen from the above, the configuration of the focal lengths of the four lens group from the object end to the image end of the zoom lens assembly of the present invention are positive, negative, positive, and positive respectively. The diaphragm is arranged between the second lens group and the third lens group. When the zoom lens assembly is zooming, the total length from the first lens group to the image end is kept unchanged, and the total length from the diaphragm to the image end is kept unchanged. In the course of zooming from the wide-angle end to the telephoto end, the second lens group moves from the object end to the image end serving as a variator; the third lens group moves from the image end to the object end serving as a collector and an assisting compensator for the fourth lens group; the fourth lens group moves fro the image end to the object end serving as a compensator.

By employing the method as above mentioned, the distance between the third lens group and the diaphragm can be changed to assist the fourth lens group in compensation, such that the diameter of elements after the diaphragm can be reduced, so as to reduce the total length and diaphragm of the overall lens. Furthermore, the third lens group also serves as the collector, whose two aspheric surfaces appropriately balance the spherical aberration on the axis while collecting light. Consequently, a third lens group having less or even a single lens can be employed to provide the light collecting function. In addition, the cemented lens of the forth lens group balances chromatic aberration, and the at least one aspheric surface decreases the number of lens of the fourth lens group, and further balances field curvature.

Consequently, the zoom lens assembly of the present invention enables miniaturization of products while meeting the requirements for high image quality, such that fabrication cost is lowered. Additionally, the zoom lens assembly of the present invention can be applied in different product classes, promoting industrial applicability thereof.

BRIEF DESCRIPTION OF THE DRAWINGS

FIG. 4 is a comparison diagram of parameters of the present invention and the prior art.

DETAILED DESCRIPTION OF THE PREFERRED EMBODIMENTS

The following embodiments are described for further illustrating the technical features of the present invention, which shall not be regarded as a limitation to the scope of the present invention.

Figure 1:
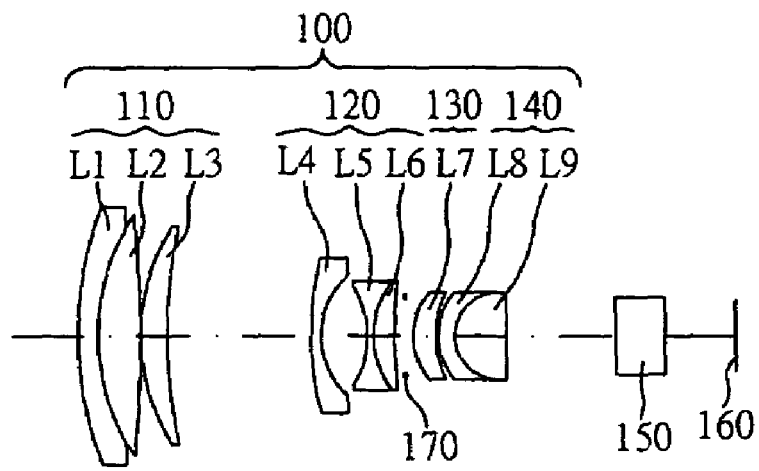
FIG. 1 is a schematic diagram of a zoom lens assembly of the preferred embodiment according to the present invention when the zoom lens assembly is zooming and operating in a telescopic mode.
Figure 2:
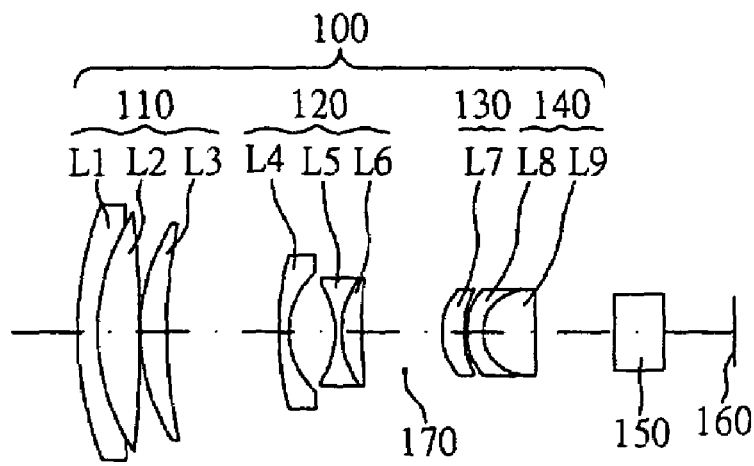
FIG. 2 is a schematic diagram of the zoom lens assembly shown in FIG. 1 when the zoom lens assembly is zooming and operating in a middle mode.
Figure 3:
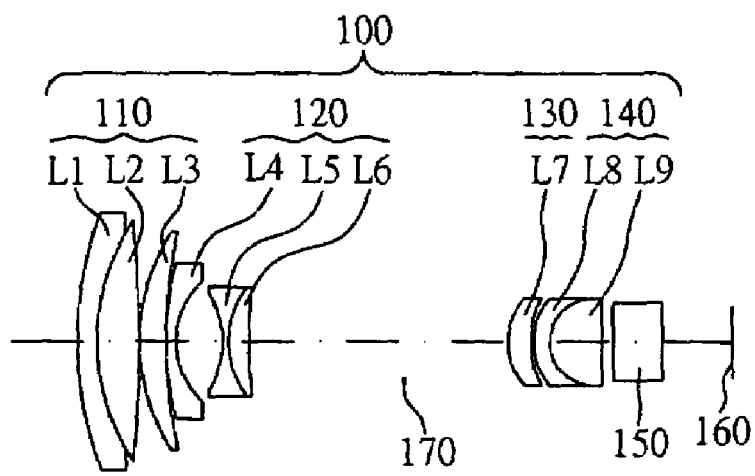
FIG. 3 is a schematic diagram of the zoom lens assembly shown in FIG. 1 when the zoom lens assembly is zooming and operating in a periscopic mode.

FIG. 1 is a schematic diagram of a zoom lens assembly 100 of a preferred embodiment according to the present invention. The zoom lens assembly 100 comprises a positive disposed first lens group 110, a negative disposed second lens group 120, a positive disposed third lens group 130 and a positive disposed fourth lens group 140, which are disposed in sequence from an object end to an image end. The zoom lens assembly 100 further comprises a filter 150, a photosensitive element 160 and an diaphragm 170 installed between the second lens group 120 and the third lens group 130. According to the preferred embodiment, the filter 150 is an optical low pass filter (OLPF), and the photosensitive element 160 is a charge coupled device (CCD) or a complementary metal oxide semiconductor (CMOS) sensor.

When the zoom lens assembly 100 is zooming, the first lens group 110 is kept apart from the image end at a constant distance. The first lens group 110 has a positive focal length. The first lens group 110 comprises a first lens L1, a second lens L2 and a third lens L3, which are disposed in sequence from the object end to the image end (the photosensitive element 160). The first lens L1 is a negative lens, the second lens L2 and third lens L3 are positive lenses. The first lens L1 and second lens L2 cooperatively form a cemented lens. According to the preferred embodiment, the third lens L3 is a positive lens in the shape of a meniscus, and can be made of an extra-low dispersion glass (ED Glass), so as to reduce a lateral chromatic aberration when the zoom lens assembly 100 is operating in a telescopic mode.

The second lens group 120 is employed as a variator, which moves from the object end to the image end when the zoom lens assembly 100 is operating from a periscopic mode to the telescopic mode. The second lens group 120 has a negative focal length. The second lens group 120 comprises a fourth lens L4, a fifth lens L5 and a sixth lens L6, which are disposed in sequence from the object end to the image end. The fourth lens LA and fifth lens L5 are negative lenses, and the sixth lens L6 is a positive lens. According to the preferred embodiment, the fifth lens L5 and sixth lens L6 cooperatively form a cemented lens.

The third lens group 130 is employed as a collector and as a compensator for the fourth lens group 140. The third lends group 130 moves from the image end to the object end when the zoom lens assembly 100 is operating from the operiscopic mode to the telescopic mode. The third lens group 130 has a positive focal length. The third lens group 130 comprises a seventh lens L7 having two aspheric surfaces. The installation of the seventh lens L7 shortens a compensation distance and simplifies a number of the lens needed by the zoom lens assembly 100. According to the preferred embodiment, the seventh lens L7 is a positive lens in the shape of the meniscus, and has a convex surface facing the object end. Although the third lens group 130 of the zoom lens assembly 100 of the first embodiment comprises only one piece of the seventh lens L7, it is noted that the third lens group 130 can be designed to comprise more lens, so as to improve image quality and adjustment of assembly.

The fourth lens group 140 is employed as a compensator and a focusing group. The fourth lens group 140 moves from the image end to the object end when the zoom lens assembly 100 is operating from the periscopic mode to the telescopic mode. The fourth lens group 140 has a positive focal length. The fourth lens group 140 comprises an eighth lens L8 and a ninth lens L9, which are disposed in sequence from the object end to the image end. The eighth lens is a negative lens, and the ninth lens L9 is a positive lens having at least an aspheric surface. According to the preferred embodiment, the eighth lens L8 and ninth lens L9 cooperatively form a cemented lens for balancing a chromatic aberration.

When the zoom lens assembly 100 of the present invention is zooming, the first lens group 110 is fixed, and a total length from the diaphragm 170 to the image end is kept unchanged. By adjusting distances among the second lens group 120, the third lens group 130 and the fourth lens group 140 along an optical axis, a variety of different zooming ratios are generated. An Image captured by the zoom lens assembly 100 are processed by the filter 150 and displayed on the photosensitive element 160. The zoom lens assembly 100 satisfies the following conditions:

$18 < T \div H < 25;$ $0.15 < (H11 \times fw) \div (H \times ft) < 0.55;$ $0.5 < t31 \div T31 < 1.0;$ and $50 < f3 \times T31 < 105,$ where H is a height of the captured image, T is the total length of the zoom lens assembly 100, H11 is a diameter of a first lens (i.e. the first lens L1) of the first lens group 110, ft is an equivalent focal length of the zoom lens assembly 100 when the zoom lens assembly 100 is operating in the telescopic mode, fw is an equivalent focal length of the zoom lens assembly 100 when the zoom lens assembly 100 is operating in the telescopic mode, t31 is a thickness of an edge region of a first lens (i.e. the seventh lens L7) of the third lens group 130, T31 is thickness of a central region of the first lens of the third lens group 130, and f3 is an equivalent focal length of the third lens group 130.

Hereinafter, a specification of the zoom lens assembly designed to have a zoom ratio of 10 (6.3 mm~63 mm), $F_{no}$ 1.8~2.6, and FOV (2ω) 60~6.6 providing image height 3.63 mm, total length 75 mm and diaphragm 13.5 mm is tabulated in the following table:

ASPHERIC CONSTANTS $$Z = \frac{(CURV)Y^2}{1 + (1 - (1+K)(CURV)Y^2)^{\frac{1}{2}}} + (A)Y^4 + (B)Y^6 + (C)Y^8 + (D)Y^{10} + (E)Y^{12} + (F)Y^{14} + (G)Y^{16} + (H)Y^{18} + (J)Y^{20},$$

where

| ASPERIC | A-1 | A-2 | A-3 |
|---|---|---|---|
| CURV = | 0.13696977 | 0.09268675 | −0.01568527 |
| K = | −0.074951 | 1.412372 | 19.439153 |
| A = | −3.07652E−05 | 1.05060E−05 | 3.82652E−04 |
| B = | −2.73260E−07 | −2.31448E−06 | 4.48071E−06 |
| C = | 4.69603E−08 | 2.50695E−07 | −1.61168E−07 |
| D = | 1.73168E−09 | −4.67747E−09 | 5.81923E−09 |
| E = | 1.01031E−11 | 1.97908E−10 | 5.31172E−18 |
| F = | 0.00000E+00 | 0.00000E+00 | 0.00000E+00 |
| G = | 0.00000E+00 | 0.00000E+00 | 0.00000E+00 |
| H = | 0.00000E+00 | 0.00000E+00 | 0.00000E+00 |
| J = | 0.00000E+00 | 0.00000E+00 | 0.00000E+00 |

REFERENCE WAVELENGTH=587.6 NM
SPECTRAL REGION=486.1~656.3 NM

| ZOOM PARAMETERS | POS.1 | POS.2 | POS.3 |
|---|---|---|---|
| *1 = | 0.1000 | 13.7410 | 16.7768 |
| *2 = | 17.6768 | 4.0358 | 1.0000 |

| Group no. | Surface no. | Radius | Thickness | Index | Vd |
|---|---|---|---|---|---|
| | OBJ: | INFINITY | INFINITY | AIR | |
| 1 | 1 | 49.68147 | 2 | 1.755201 | 27.5795 |
| | 2 | 26.46925 | 5.102059 | 1.587712 | 80 |
| | 3 | −128.90094 | 0.1 | AIR | |
| | 4 | 25.12075 | 2.839391 | 1.600431 | 61.3966 |
| | 5 | 56.37644 | Variable | AIR | |
| 2 | 6 | 42.47046 | 1 | 1.773 | 49.6 |
| | 7 | 9.24027 | 4.967505 | AIR | |
| | 8 | −11.58133 | 0.8 | 1.678 | 55.5 |
| | 9 | 10.55698 | 2.470402 | 1.805 | 25.4 |
| | 10 | −4127.2188 | Variable | AIR | |
| | STO: | INFINITY | Variable | AIR | |
| 3 | 12 | 7.30088 | 2.389927 | 1.603 | 60 |
| | ASP: | | | | |
| | | K = −0.074951 | A = −0.307652E−04 | B = −0.273260E−06 | C = 0.469603E−07 |
| | | D = 0.173168E−08 | E = 0.101031E−10 | | |
| | 13 | 10.78903 | Variable | AIR | |
| | ASP: | | | | |
| | | K = 1.412372 | A = 0.105060E−04 | B = −0.231448E−05 | C = 0.250695E−06 |
| | | D = −0.467747E−08 | E = 0.197908E−09 | | |
| 4 | 14 | 9.02174 | 1.812612 | 1.805 | 25.4 |
| | 15 | 5.09045 | 5.52336 | 1.516 | 64.1 |
| | 16 | −63.75409 | Variable | AIR | |
| | ASP: | | | | |
| | | K = 19.439153 | A = 0.382652E−03 | B = 0.448071E−05 | C = −0.161168E−06 |
| | | D = 0.581923E−08 | E = 0.531172E−17 | | |
| | 17 | INFINITY | 5.801558 | 1.516 | 64.1 |
| | 18 | INFINITY | 8.203371 | AIR | |
| | IMG: | INFINITY | 0 | AIR | |
| | zoom data | | Wide | Middle | Tele |
| | | EFL | 6.3 | 32.3 | 63 |
| | | FOV | 29.95 | 6.37 | 3.31 |
| | | F:no | 1.85 | 2.22 | 2.63 |
| | | THI S5 | 0.1 | 13.74102 | 16.77684 |
| | | THI S10 | 17.67684 | 4.03583 | 1 |
| | | THI S11 | 10.77885 | 4.76907 | 1 |
| | | THI S13 | 2.00539 | 0.82957 | 0.5 |
| | | THI S16 | 1.42874 | 8.61434 | 12.71297 |

-continued

| ZOOM PARAMETERS | POS.1 | POS.2 | POS.3 |
|---|---|---|---|
| *3 = | 1.4287 | 8.6143 | 12.7130 |
| *4 = | 2.0054 | 0.8296 | 0.5000 |
| *5 = | 10.7788 | 4.7691 | 1.0000 |

The above disclosed conditions respectively represent the features of: a ratio of the total length of the zoom lens assembly 100 and the height of the image, a relationship between a lens diaphragm and the zooming ratio, a size configuration of the third lens group 130, and a relationship between the size configuration of the third lens group 130 and the focal length. Compared with the prior art, the present invention solves the problem due to miniaturization of the zoom lens assembly, further enhances the image quality of the zoom lens assembly and decreases the number of lenses, and which is suitable for the photosensitive elements to serve as a sensor. Therefore, the requirement of lowering the cost is met. Moreover, it can be suitably applied to the zoom lens assembly of different product classes.

FIG. 4 shows a comparison between five groups of specific values and the above mentioned eight US patents, wherein the lens of the present invention covers a zooming ratio of 10~12, suitable for photosensitive elements of $1/2.7''$~$1/2.5''$, field of view (FOV, 2ω) 60 degree, $F_{NO}$ reaching 1.8. Under the circumstance of the total length of zoom lens assembly is 75 mm, the number of lenses decreases to 9 pieces. A 4-mega-pixels class can be achieved.

It can be understood from above, the configuration of the focal lengths of the four lens group from the object end to the image end of the zoom lens assembly of the present invention are positive, negative, positive, and positive. The diaphragm 170 is arranged between the second lens group 120 and the third lens group 130. During zooming, the total length from the first lens group 110 to the image end is kept unchanged, and the total length from the diaphragm 170 to the image end is kept unchanged. In the course of zooming from the wide-angle end to the telephoto end, the second lens group 120 moves from the object end to the image end, serving as the variator; the third lens group 130 moves from the image end to the object end, serving as the collector and the assisting compensator for the fourth lens group 140; the fourth lens group 140 moves from the image end to the object end, serving as the compensator.

By employing the method as mentioned above, the distance between the third lens group 130 and the diaphragm 170 can be changed to assist the fourth lens group 140 in compensation, such that the diameter of elements after the diaphragm 170 can be reduced, so as to reduce the total length and diaphragm of the overall lens. Furthermore, the third lens group 130 also serves as the collector, whose two aspheric surfaces appropriately balance the spherical aberration on the axis while collecting light. Consequently, a third lens group having less or even a single lens can be employed to provide the light collecting function. In addition, the cemented lens of the forth lens group 140 balances chromatic aberration, and the at least one aspheric surface decreases the number of lens of the fourth lens group 140, and further balances field curvature.

Consequently, the zoom lens assembly of the present invention enables miniaturization of products while meeting the requirements for high image quality, such that fabrication cost is lowered. Additionally, the zoom lens assembly of the present invention can be applied in different product classes, promoting industrial applicability thereof.

It should be apparent to those skilled in the art that the above description is only illustrative of specific embodiments and examples of the present invention. The present invention should therefore cover various modifications and variations made to the herein-described structure and operations of the present invention, provided they fall within the scope of the present invention as defined in the following appended claims.

What is claimed is:

1. A zoom lens assembly comprising:
an object end;
an image end;
a first lens group having a positive focal length, the first lens group being stationary when the zoom lens assembly is zooming;
a second lens group having a negative focal length, the second lens group moving from the object end to the image end when the zoom lens assembly is zooming and operating from a periscopic mode to a telescopic mode;
a third lens group having a positive focal length, the third lens group moving from the image end to the object end when the zoom lens assembly is zooming and operating from the periscopic mode to the telescopic mode; and
a fourth lens group having a positive focal length, the fourth lens group moving from the image end to the object end when the zoom lens assembly is zooming and operating from the periscopic mode to the telescopic mode;
wherein the first, second, third and fourth lens group are disposed in sequence from the object end to the image end, and the zoom lens assembly satisfies the following conditions:

$18 < T \div H < 25$, $0.15 < (H11 \times fw) \div (H \times ft) < 0.55$, $0.5 < t31 \div T31 < 1.0$, and $50 < f3 \times T31 < 105$, where H is a height of an image captured by the zoom lens assembly, T is a total length of the zoom lens assembly, H11 is a diameter of a first lens of the first lens group, ft is an equivalent focal length of the zoom lens assembly when the zoom lens assembly is operating in the telescopic mode, fw is an equivalent focal length of the zoom lens assembly when the zoom lens assembly is operating in the periscopic mode, t31 is a thickness of an edge region of a first lens of the third lens group, T31 is a thickness of a central region of the first lens of the third lens group, and f3 is an equivalent focal length of the third lens group.

2. The zoom lens assembly as claimed in claim 1, wherein the first lens group comprises in sequence from the object end to the image end a first lens, a second lens and a third lens, the first lens being a negative lens, the second and third lenses being positive lenses.

3. The zoom lens assembly as claimed in claim 2, wherein the first and second lenses cooperatively form a cemented lens.

4. The zoom lens assembly as claimed in claim 2, wherein the third lens is a positive lens in the shape of a meniscus.

5. The zoom lens assembly as claimed in claim 1, wherein the second lens group comprises in sequence from the object end to the image end a fourth lens, a fifth lens and a sixth lens, the fourth and fifth lenses being negative lenses, the sixth lens being a positive lens.

6. The zoom lens assembly as claimed in claim 5, wherein the fifth and sixth lenses cooperatively form a cemented lens.

7. The zoom lens assembly as claimed in claim 1, wherein the third lens group comprises at least a seventh lens comprising two aspheric surfaces.

8. The zoom lens assembly as claimed in claim 7, wherein the seventh lens is a positive lens in the shape of a meniscus, and comprises a convex surface facing the object end.

9. The zoom lens assembly as claimed in claim 1, wherein the fourth lens group comprises in sequence from the object end to the image end an eighth lens and a ninth lens, the eighth lens being a negative lens, the ninth lens being a positive lens and comprising at least an aspheric surface.

10. The zoom lens assembly as claimed in claim 9, wherein the eighth and ninth lenses cooperatively form a cemented lens.

11. The zoom lens assembly as claimed in claim 1 further comprising a diaphragm installed between the second lens group and the third lens group.

12. The zoom lens assembly as claimed in claim 11, wherein the diaphragm is stationary relative to the image end when the zoom lens assembly is zooming.

13. The zoom lens assembly as claimed in claim 1 further comprising a filter and at least a photosensitive element.

14. The zoom lens assembly as claimed in claim 13, wherein the filter is an optical low pass filter.

15. The zoom lens assembly as claimed in claim 13, wherein the photosensitive element is a charge coupled device (CCD).

16. The zoom lens assembly as claimed in claim 13, wherein the photosensitive element is a Complementary Metal Oxide Semiconductor (CMOS) sensor.

17. A zoom lens assembly comprising:
an object end;
an image end;
a first lens group having a positive focal length, the first lens group comprising in sequence from the object end to the image end a first lens, a second lens and a third lens, the first lens being a negative lens, the second and third lenses being positive lenses;
a second lens group having a negative focal length, the second lens group comprising in sequence from the object end to the image end a fourth lens, a fifth lens and a sixth lens, the fourth and fifth lenses being negative lenses, the sixth lens being a positive lens;
a third lens group having a positive focal length and at least a seventh lens comprising two aspheric surfaces;
a fourth lens group having a positive focal length, the fourth lens group comprising in sequence from the object end to the image end an eighth lens and a ninth lens, the eighth lens being a negative lens, the ninth lens being a positive lens and comprising at least an aspheric surface;
wherein the first, second, third and fourth lens groups are disposed in sequence from the object end to the image end, and the zoom lens assembly satisfies the following conditions:

$18 < T \div H < 25$, $0.15 < (H11 \times fw) \div (H \times ft) < 0.55$, $0.5 < t31 \div T31 < 1.0$, and $50 < f3 \times T31 < 105$, where H is a height of an image captured by the zoom lens assembly, T is a total length of the zoom lens assembly, H11 is a diameter of a first lens of the first lens group, ft is an equivalent focal length of the zoom lens assembly when the zoom lens assembly is operating in the telescopic mode, fw is an equivalent focal length of the zoom lens assembly when the zoom lens assembly is operating in the periscopic mode, t31 is a thickness of an edge region of a first lens of the third lens group, T31 is a thickness of a central region of the first lens of the third lens group, and f3 is an equivalent focal length of the third lens group.

18. The zoom lens assembly as claimed in claim 17, wherein the first and second lenses cooperatively form a cemented lens.

19. The zoom lens assembly as claimed in claim 17, wherein the third lens is a positive lens in the shape of a meniscus.

20. The zoom lens assembly as claimed in claim 17, wherein the fifth and sixth lenses cooperatively form a cemented lens.

21. The zoom lens assembly as claimed in claim 17, wherein the seventh lens is a positive lens in the shape of a meniscus and comprises a convex surface facing the object end.

22. The zoom lens assembly as claimed in claim 17, wherein the eighth and ninth lenses cooperatively form a cemented lens.

23. The zoom lens assembly as claimed in claim 17 further comprising a diaphragm installed between the second lens group and the third lens group.

24. The zoom lens assembly as claimed in claim 23, wherein the diaphragm is stationary relative to the image end when the zoom lens assembly is zooming.

25. The zoom lens assembly as claimed in claim 17 further comprising a filter and at least a photosensitive element.

26. The zoom lens assembly as claimed in claim 25, wherein the filter is an optical low pass filter.

27. The zoom lens assembly as claimed in claim 25, wherein the photosensitive element is a CCD.

28. The zoom lens assembly as claimed in claim 25, wherein the photosensitive element is a CMOS sensor.

29. The zoom lens assembly as claimed in claim 17, wherein when the zoom lens assembly is zooming and operating from a periscopic mode to a telescopic mode, the second lens group moves from the object end to the image end, and the third and fourth lens groups move from the image end to the object end.

* * * * *

UNITED STATES PATENT AND TRADEMARK OFFICE
CERTIFICATE OF CORRECTION

PATENT NO. : 7,149,038 B2  Page 1 of 1
APPLICATION NO. : 11/385891
DATED : December 12, 2006
INVENTOR(S) : Gung Hsuan Ho et al.

It is certified that error appears in the above-identified patent and that said Letters Patent is hereby corrected as shown below:

On the Title Page
Item (30) Foreign Application Priority Data. Please insert the following:

--Item (30)   Foreign Application Priority Data
March 23, 2005   Taiwan............ 094108914 --

Signed and Sealed this

Seventh Day of August, 2007

JON W. DUDAS
*Director of the United States Patent and Trademark Office*